United States Patent
Nandi et al.

(10) Patent No.: US 7,272,674 B1
(45) Date of Patent: Sep. 18, 2007

(54) SYSTEM AND METHOD FOR STORAGE DEVICE ACTIVE PATH COORDINATION AMONG HOSTS

(75) Inventors: Siddhartha Nandi, Pune (IN); Abhay K. Singh, Pune (IN); Oleg Kiselev, Palo Alto, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 661 days.

(21) Appl. No.: 10/610,137

(22) Filed: Jun. 30, 2003

(51) Int. Cl.
*G06F 3/00* (2006.01)

(52) U.S. Cl. .......................... 710/38; 710/15; 710/18; 710/19; 710/36; 370/216; 370/248; 370/252; 714/42; 714/43

(58) Field of Classification Search .................... None
See application file for complete search history.

(56) References Cited

U.S. PATENT DOCUMENTS

| | | | |
|---|---|---|---|
| 6,256,748 B1 * | 7/2001 | Pinson | 714/6 |
| 6,789,141 B2 * | 9/2004 | Ayukawa et al. | 710/38 |
| 6,904,469 B2 * | 6/2005 | Ido et al. | 710/6 |
| 6,954,881 B1 * | 10/2005 | Flynn Jr. et al. | 714/43 |

* cited by examiner

*Primary Examiner*—Kim Huynh
*Assistant Examiner*—Eron Sorrell
(74) *Attorney, Agent, or Firm*—Campbell Stephenson LLP (57) ABSTRACT

Systems, methods, apparatus and software can make use of persistent reservation commands to establish the port of a shared device that is to be used as an active port by one or more host computer systems coupled to the shared device. Information about one or more paths used to transmit data between a host computer system and the shared device can be used by other host computer systems.

28 Claims, 7 Drawing Sheets

SYSTEM AND METHOD FOR STORAGE DEVICE ACTIVE PATH COORDINATION AMONG HOSTS

FIELD OF THE INVENTION

The present invention relates to storage devices in distributed computer systems and, more particularly, to coordinating the use of storage devices among multiple hosts in a distributed computer system.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. These storage devices can be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

Figure 1:
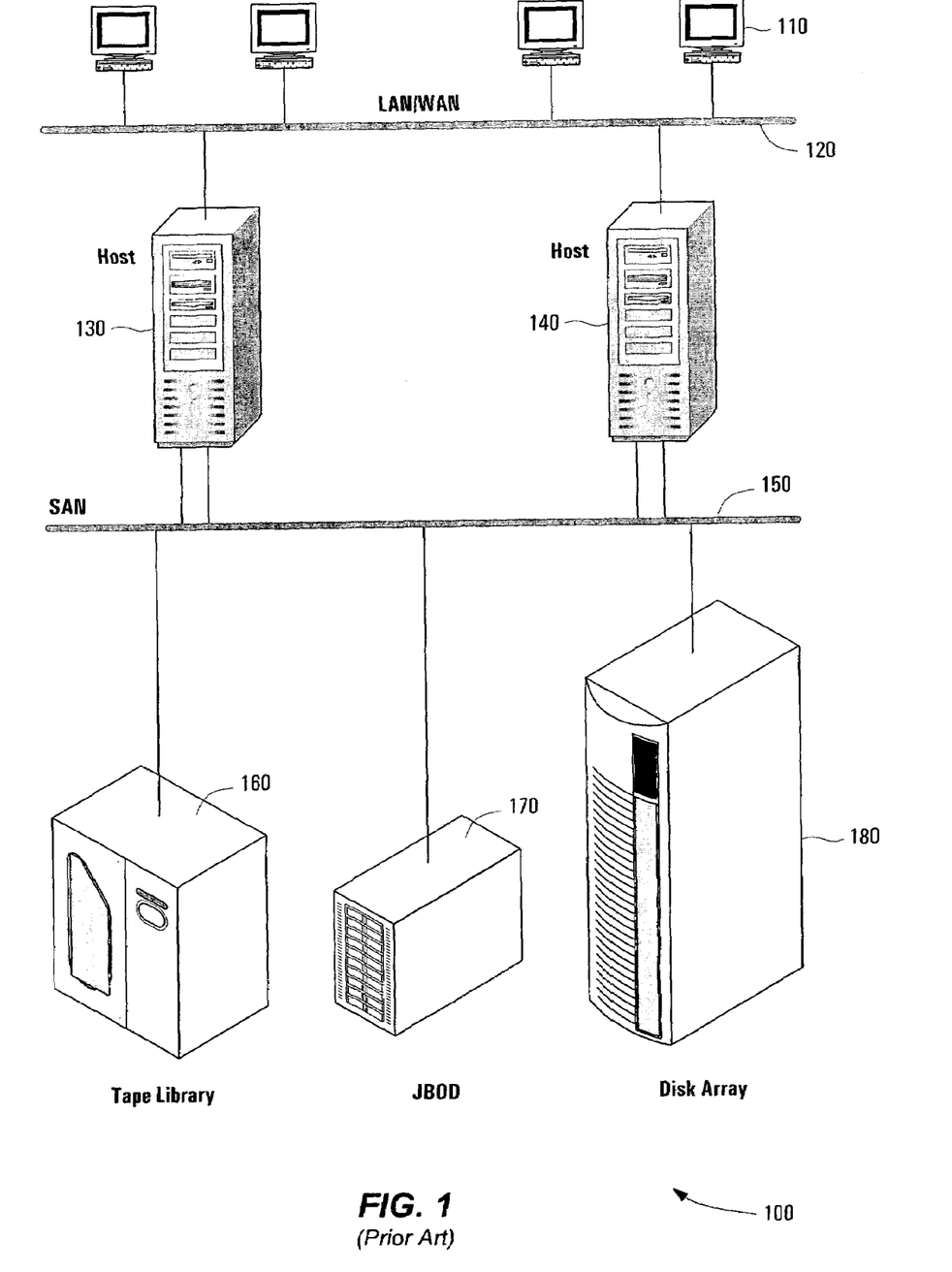
FIG. 1 is a simplified block diagram of a computing system.
Figure 8:
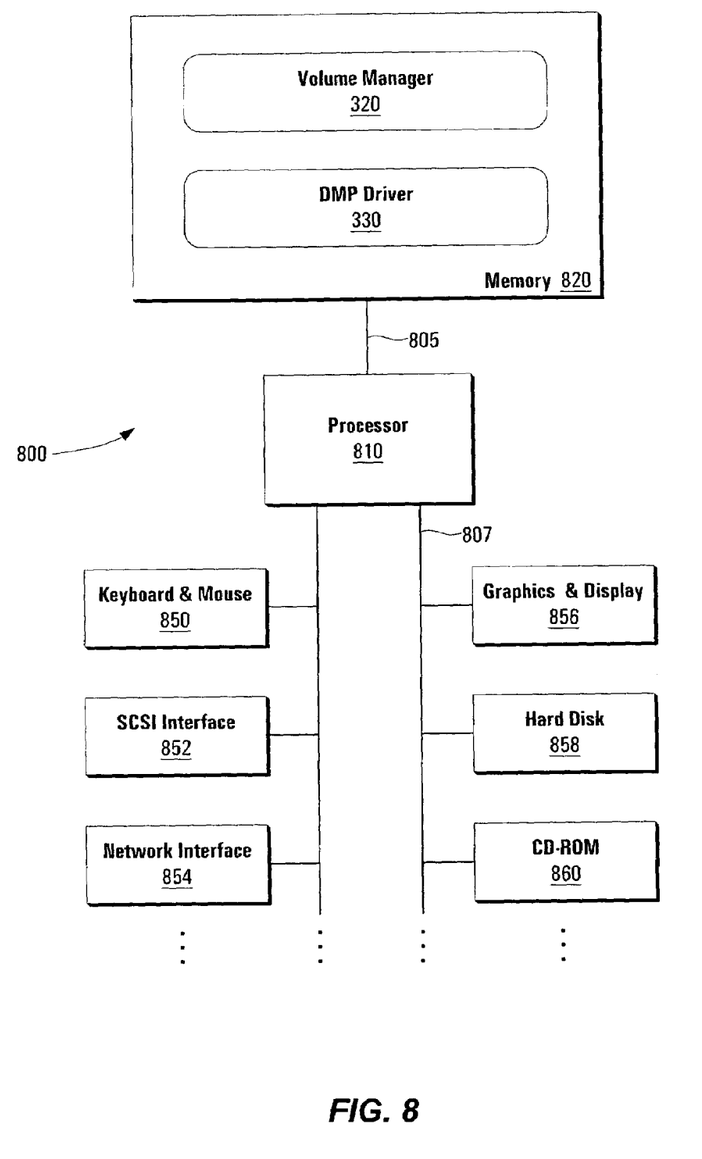
FIG. 8 is a block diagram of a computer system for implementing the techniques of the present invention.

FIG. 1 illustrates a simplified example of a computing system 100. The members of the computing system 100 include host 130 and host 140. As members of computing system 100, hosts 130 and 140, typically some type of application, data, or file server, are often referred to "nodes." Hosts 130 and 140 can be designed to operate completely independently of each other, or may interoperate to form some manner of cluster. Thus, hosts 130 and 140 are typically individual computer systems having some or all of the software and hardware components well known to those having skill in the art. FIG. 8 (described below) illustrates some of the features common to such computer systems. In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150 and storage devices such as tape library 160 (typically including one or more tape drives), a group of disk drives 170 (i.e., "just a bunch of disks" or "JBOD"), and intelligent storage array 180. As shown in FIG. 1, both hosts 130 and 140 are coupled to SAN 150. SAN 150 is conventionally a high-speed network that allows the establishment of direct connections between storage devices 160, 170, and 180 and hosts 130 and 140. SAN 150 can also include one or more SAN specific devices such as SAN switches, SAN routers, SAN hubs, or some type of storage appliance. Thus, SAN 150 is shared between the hosts and allows for the sharing of storage devices between the hosts to provide greater availability and reliability of storage. Although hosts 130 and 140 are shown connected to storage devices 160, 170, and 180 through SAN 150, this need not be the case. Shared resources can be directly connected to some or all of the hosts in the computing system, and computing system 100 need not include a SAN. Alternatively, hosts 130 and 140 can be connected to multiple SANs.

Figure 2:
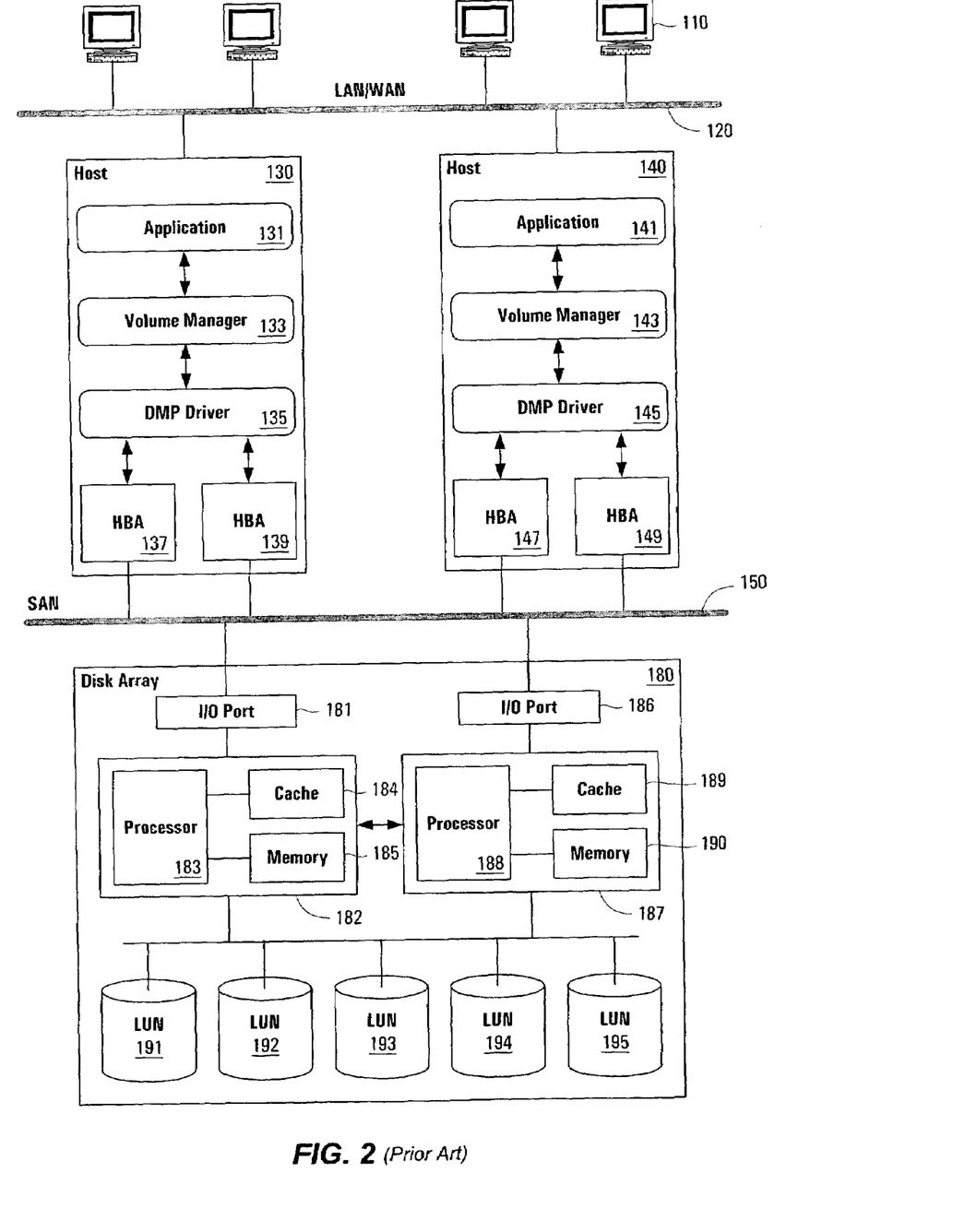
FIG. 2 is a simplified block diagram illustrating in greater detail several components of the computing system shown in FIG. 1.

FIG. 2 illustrates in greater detail several components of computing system 100. For example, disk array 180 is shown to include two input/output (I/O) ports 181 and 186. Associated with each I/O port is a respective storage controller (182 and 187), and each storage controller generally manages I/O operations to and from the storage array through the associated I/O port. In this example, each storage controller includes a processor (183 and 188), a cache memory (184 and 189) and a regular memory (185 and 190). Although one or more of each of these components is typical in disk arrays, other variations and combinations are well known in the art. The disk array also includes some number of disk drives (logical units (LUNs) 191-195) accessible by both storage controllers. As illustrated, each disk drive is shown as an LUN which is generally an indivisible unit presented by a storage device to its host(s). Logical unit numbers, also sometimes referred to as LUNs, are typically assigned to each disk drive in an array so the host can address and access the data on those devices. In some implementations, an LUN can include multiple devices, e.g., several disk drives, that are logically presented as a single device.

FIG. 2 also illustrates some of the software and hardware components present in hosts 130 and 140. Both hosts 130 and 140 execute one or more application programs (131 and 141) respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices such as disk array 180. Hosts 130 and 140 also execute volume manager (133 and 143) which enables physical resources configured in the computing system to be managed as logical devices. An example of software that performs some or all of the functions of volume manager 330 is the VERITAS Volume Manager™ product provided by VERITAS Software Corporation. Hosts 130 and 140 take advantage of the fact that disk array 180 has more than one I/O port using dynamic multipathing (DMP) drivers (135 and 145) as well as multiple host bus adaptors (HBAs) 137, 139, 147, and 149. The HBAs provide a hardware interface between the host bus and the storage network, typically implemented as a Fibre Channel network. Hosts 130 and 140 each have multiple HBAs to provide redundancy and/or to take better advantage of storage devices having multiple ports.

The DMP functionality enables greater reliability and performance by using path failover and load balancing. In general, the multipathing policy used by DMP drivers 135 and 145 depends on the characteristics of the disk array in use. Active/active disk arrays (A/A arrays) permit several paths to be used concurrently for I/O operations. Such arrays enable DMP to provide greater I/O throughput by balancing the I/O load uniformly across the multiple paths to the disk devices. In the event of a loss of one connection to an array, the DMP driver automatically routes I/O operations over the other available connections to the array. Active/passive arrays in so-called auto-trespass mode (A/P arrays) allow I/O operations on a primary (active) path while a secondary (passive) path is used if the primary path fails. Failover occurs when I/O is received or sent on the secondary path. Active/passive arrays in explicit failover mode (A/PF arrays) typically require a special command to be issued to the array for failover to occur. Active/passive arrays with LUN group failover (A/PG arrays) treat a group of LUNs that are connected through a controller as a single failover entity. Failover occurs at the controller level, and not at the LUN level (as would typically be the case for an A/P array in auto-trespass mode). The primary and secondary controller are each connected to a separate group of LUNs. If a single LUN in the primary controller's LUN group fails, all LUNs in that group fail over to the secondary controller's passive LUN group.

Because of their relative simplicity and lower costs, A/P disk arrays are commonly found in SAN environments. However, in A/P disk arrays with two I/O ports, both of the access ports generally cannot be used concurrently without causing substantial I/O performance degradation. For example, since the active port is typically the port used for I/O to disk array, the active port is usually the primary port of the array, but it could be the secondary port if the primary port is not available due to, for example, failure. Hosts discover the primary and/or secondary port, but it is not known without some communication among the sharing hosts which port should be selected as an active port. Thus, among the problems associated with sharing the disks of an A/P (e.g., an A/P, A/PG, or A/PF) array from multiple hosts are: (1) arriving at a consensus among hosts about the appropriate access port to use; (2) arriving at a consensus among hosts about the appropriate access port for failover; and (3) performing actual failover.

Accordingly, it is desirable to have efficient and convenient mechanisms for storage device and particularly disk array I/O path coordination among storage device clients such as hosts in SAN environments.

SUMMARY OF THE INVENTION

It has been discovered that systems, methods, apparatus and software can make use of persistent reservation commands to establish the port of a shared device that is to be used as an active port by one or more host computer systems coupled to the shared device. Information about one or more paths used to transmit data between a host computer system and the shared device can be used by other host computer systems.

Accordingly, one aspect of the present invention provides a method. Information about at least one input/output (I/O) port of a shared device belonging to a distributed computing system is received. A path attribute is formed using at least a portion of the information about at least one I/O port of a shared device. The path attribute at least partially describes at least one data transmission path between a host computer system and the shared device. The path attribute is sent to the shared device.

In another aspect of the present invention, a system includes a shared device discovery module and a path manager in communication with the shared device discovery module. The shared device discovery module is configured to determine information about at least one input/output (I/O) port of a shared device belonging to a distributed computing system. The path manager is operable to process the information about the at least one I/O port of a shared device to form a path attribute. The path attribute at least partially describes at least one data transmission path between a host computer system and the shared device. The path manager is also operable to transmit the path attribute to the shared device.

Yet another aspect of the present invention provides an apparatus including a means for receiving information about at least one input/output (I/O) port of a shared device belonging to a distributed computing system; a means for receiving information about at least one input/output (I/O) port of a shared device belonging to a distributed computing system; and a means for sending the path attribute to the shared device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

The systems, methods, apparatus and software of the present invention make use of persistent resource registration and reservation commands. In particular, this description will focus on the use of small computer system interface version 3 (SCSI-3) persistent reservation and registration commands. However, systems, methods, apparatus and software of the present invention need not be limited to SCSI-3 commands. Protocols and/or standards implementing similar shared resource reservation/registration commands and allowing the use of persistent attributes associated with such shared resources can be used to implement the systems, methods, apparatus and software disclosed herein. Thus, reference to registration and/or reservation commands and keys need not refer specifically to SCSI-3 registration and/or reservation commands and keys, but rather to any commands and attributes that can be used to accomplish the same or similar tasks. Any device command structure providing similar functionality can be used, and SCSI-3 persistent resource registration and reservation commands are only one example. Useful SCSI-3 commands include READ KEYS and READ RESERVATIONS persistent reservation in commands; and REGISTER, RESERVE, RELEASE, CLEAR, PREEMPT, and PREEMPT AND ABORT persistent reservation out commands. SCSI-3 defines both the physical interconnections between compliant devices and the commands which can pass among them. Devices which comply with the SCSI-3 standard can include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices are all examples of shared resources and shared data resources. SCSI-3 commands are described in *SCSI Primary Commands*-3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. SCSI-3 persistent reservation and registration commands are summarized at the end of this detailed description.

Figure 3:
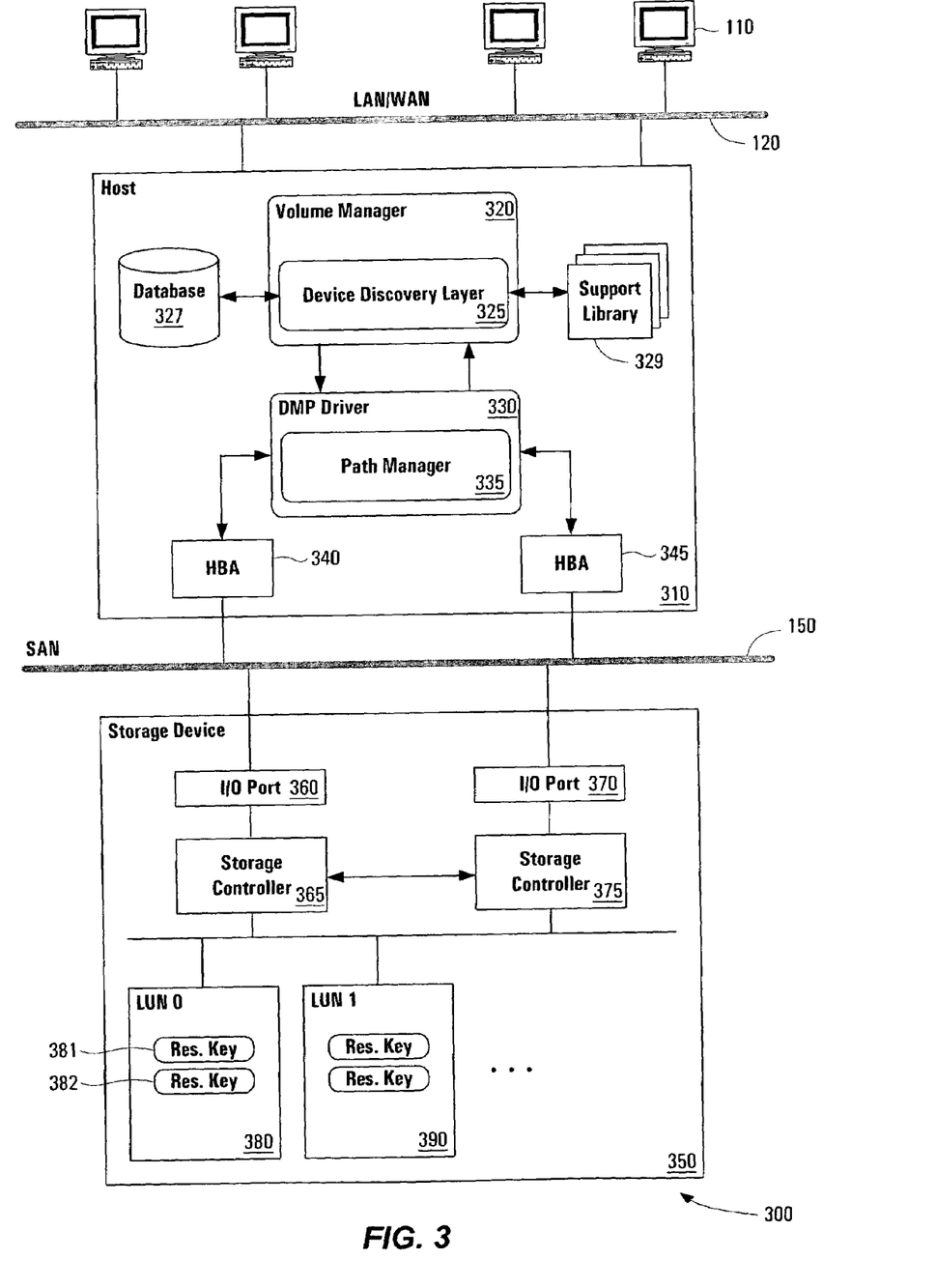
FIG. 3 is a simplified block diagram of portions of a computing system including a host computer system utilizing some of the systems and methods of the present invention.

FIG. 3 is a simplified block diagram of portions of a computing system including a host computer system utilizing some of the systems and methods of the present invention. In the example illustrated, host computer system 310 includes a volume manager 320 that possesses additional functionality in device discovery layer 325. Although illustrated as part of volume manager 320, device discovery layer 325 can be a separate program, or a service available to volume manager 320, e.g., a service provided to a configuration daemon volume manager 320. Configuration daemon 14 corresponds to a process responsible for discovering the attributes of storage devices, such as multi-path attributes of disks and disk arrays. Because host computer system 310 can in general be used with a variety of different storage devices such as storage device 350, volume manager 320 and other software components such as DMP driver 330 are designed to operate in a heterogeneous storage environment. Thus, device discovery layer 325 working alone or in conjunction with other portions of volume manager 320 and/or additional software components (not shown) is responsible for discovering various attributes of storage devices, such as multi-path attributes of disks and disk arrays. Device discovery layer 325 can also be used to discover enclosure information, if available, from storage devices. Enclosure information can, for example, be used by volume manager 320 to determine an appropriate storage device in which to store certain data.

Device discovery layer 325 stores information about various storage devices in database 327. Moreover, since hardware and/or software characteristics of storage devices can differ significantly, e.g., because of differences among device manufacturers, the procedures used to discover device attributes can differ among devices. Consequently, dynamic discovery layer 325 can use a set of device support libraries 329 that provide device information specific to the storage devices of particular vendors. In one implementation, each device support library in the set of device support libraries 329 is a storage device-specific dynamically loadable library. Dynamic discovery layer 325 gathers attributes of the storage devices connected to a host and configures DMP driver 330 for a particular storage device, such as storage device 350, so that volume manager 310 can access and use the device. Configuration of DMP driver 330 enables multipathing features, as described above, within corresponding storage device 350.

DMP driver 330 also includes path manager 335 which is responsible for implementing path management logic, forming reservation keys used in path management, and communicating (directly and/or indirectly using reservations keys) among the hosts connected to a particular storage device. In this way, path manager 335 communicates active and passive storage device path information and forces consensus among hosts about which paths to use for a particular function. In one embodiment, path manager 335 uses SCSI-3 persistent reservation commands to communicate among the hosts about the path information and to force consensus on the failover path. In such an embodiment, storage devices suitable for operation in conjunction with path manager 335 should: (1) support SCSI-3 persistent reservation commands; (2) provide some mechanism allowing the determination of the active port (LUN ownership); and (3) for A/PG devices, provide access to all the LUNs of a LUN group from all the sharing hosts.

Device discovery layer 325 is used to discover the active port of the relevant storage device (e.g., either I/O port 360 or I/O port 370 of storage device 350). Device discovery layer 325 typically discovers the two (or in some cases more) possible active ports, e.g. primary and secondary. Path manager 335 decides which port will be active and which one will be passive and sets the active path utilizing this information. SCSI-3 persistent reservation keys are by definition eight bytes in length. In this example, two bytes of the persistent reservation key are used by path manager 335 to encode host to LUN connectivity information, also called the "path attribute". The remaining six bytes are available for other use by other applications. SCSI-3 persistent reservation keys such as reservation keys 381 and 382 are stored by various LUNs (e.g., LUN 0 380 and LUN 1 390) to record path attribute information used in determining and maintaining active and passive paths. Additionally, if other software operating on host computer system 310, e.g., volume manager 320, makes use of SCSI-3 persistent reservation commands, it may be desirable to have all persistent reservation related actions will be routed through DMP driver 330 so that it can maintain the reservation key(s) correctly.

Table 1 illustrates an example of how the path attribute information might be stored in a SCSI-3 reservation key.

TABLE 1

| Byte | Bit | | | | | | | |
|---|---|---|---|---|---|---|---|---|
| | 7 | 6 | 5 | 4 | 3 | 2 | 1 | 0 |
| 0 | APN | | | | APC | | ACTIVE | KEEP |
| 1 | | | | | PCON | | | |

The KEEP flag can be used by host computer system software, e.g., volume manager 320 or some other software component, to ensure that the host computer system always has access to the disk possessing the reservation key. For example, in the case of a path failover, host access to the corresponding LUN may need to be maintained and the KEEP bit provides information used to ensure that connection is made. The ACTIVE flag indicates whether or not a host is able to access a particular LUN even when one or more good paths are available to the host. Thus, an ACTIVE flag value of "false" would indicate that a host is unable to access the corresponding LUN.

If a host can access a particular LUN using more than one path, it is desirable that the host register through each of the possible paths. The APC (Active Path Count) bits indicate the number of paths being used by the host computer system to access the corresponding LUN. The examples illustrated in this application focus on systems with two paths between a given host computer system and an LUN. However, additional bits are reserved to provide for additional paths between host and LUN. In most examples, a disk array will have two access ports—primary and secondary, and so the value of APN (Active Port Number) will be 0 for access through the primary port and 1 for access through the secondary port. More bits are reserved to support more than one secondary port. Moreover, different labeling schemes can be used. The PCON (Port Connectivity) field has one bit for each access port of the storage device. A bit pattern indicates the port numbers (bit position within the byte) accessible from the host. Each bit has either a true or false value depending upon whether the corresponding host can access the LUN using the access port. Again, a typical disk array used will have only two ports, but additional bits are provided to support devices having more than two ports. Note that data described in Table 1, and its respective sizes and labels, is merely illustrative of the type of data that can be stored. Additional (or less) information can be included.

Other system components illustrated in FIG. 3 function in a manner similar to corresponding components shown in FIG. 2. For example, host bus adapters 340 and 345 provide a hardware interface between the host bus of host computer system 310 and SAN 150. Storage controllers 365 and 375 generally manage I/O operations to and from the storage device 350 through the associated I/O port. Although only two LUNs are shown in storage device 350, such devices typically have many LUNs as illustrated by the ellipsis in the figure. Additionally, although path manager 325 is shown as part of DMP driver 330, path manager 335 can be implemented as a separate software module or entity executing on host computer system 310.

Figure 4:
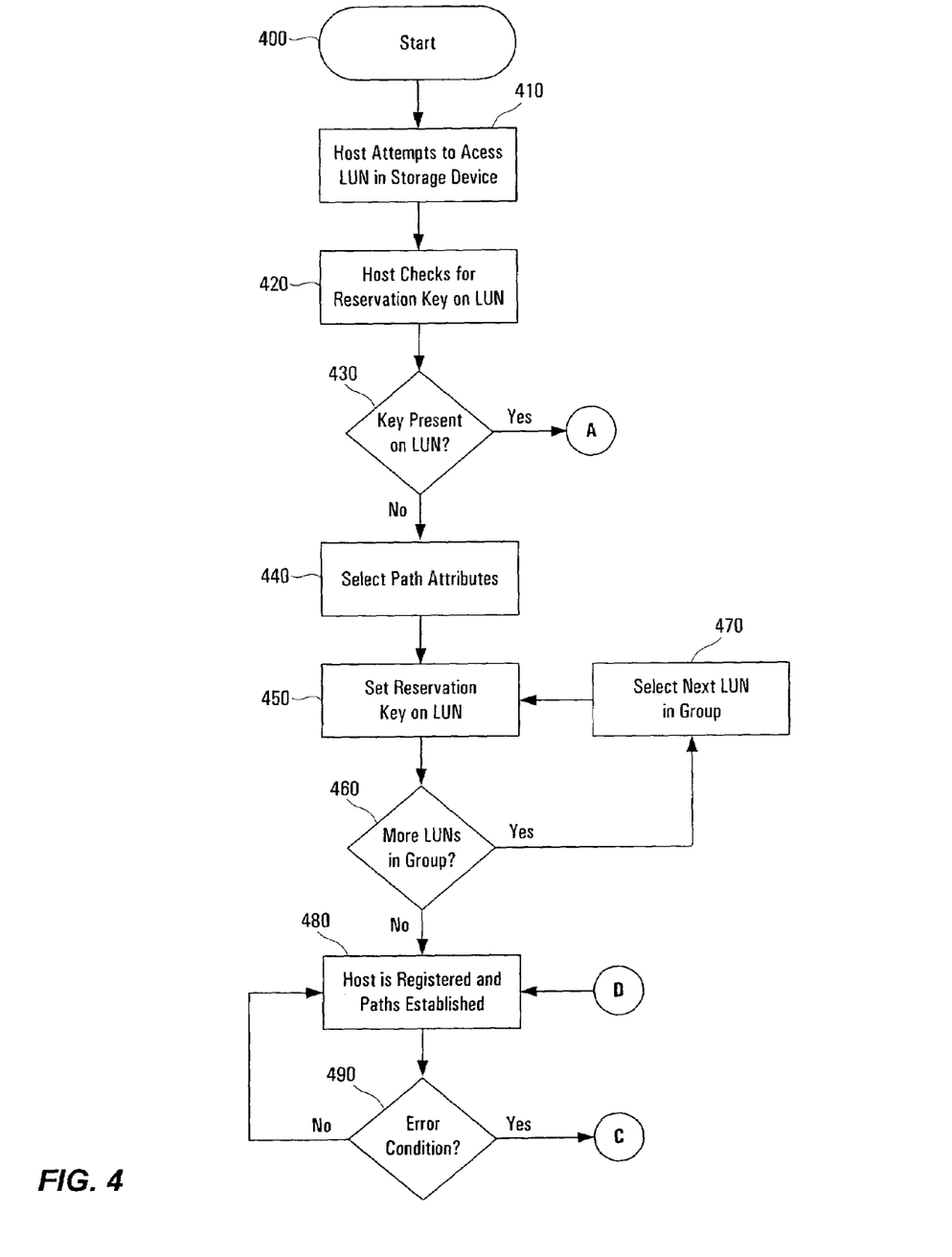
FIG. 4 is a flow chart illustrating techniques of the present invention.

Operation of systems and methods for providing active path coordination and selection are illustrated in FIG. 4. Operation begins 400 with a host computer system that implements path manager functionality such as host 310 executing path manager 325 as part of DMP driver 330. As shown in step 410, a host attempts to access an LUN in a storage device. The access attempt can generally be any type of I/O access attempt, e.g., a read or write operation. Alternately, the access attempt may simple be a query to the LUN itself for information about the LUN and not necessarily an I/O operation targeting data stored in the LUN. The host checks the target LUN (420) by attempting to read a reservation key associated with the LUN. For example, the host (via path manager functionality) issues a PERSISTENT RESERVE IN command to the target LUN specifying the READ RESERVATION service action code. By using the READ RESERVATION service action code, the command specifies that information about current persistent reservations (e.g., reservations placed by other hosts) is to be returned by the LUN. Alternately, the READ KEYS service action code can be used, thereby causing the target LUN to return all registered reservation keys associated with the LUN.

If one or more reservation keys are returned, operation transitions to step 500 shown in FIG. 5 and described below. If no reservation key is found as determined at 430, operation proceeds to step 440 where path manager logic establishes the path attributes to be used. Path attribute information includes primary path, secondary path, and active path information along with desired flag values as discussed above. This information may already be available to the host computer system, e.g., as determined by device discovery layer 325 of FIG. 3 and stored in database 327, or the host computer system may have to determine the required path attribute information at this time. In one example, path manager 335 has the connectivity information (via device discovery layer 325 discovered attributes) about disks present in the system that includes number of paths to the disk, which path is primary, which path is secondary, which paths are connected and which paths have lost the connection. With this information, path manager 335 generates the key for the disks. The generated key can be in the format shown in Table 1, and is appended to a 6-byte persistent reservation key supplied to the path manager. If the persistent reservation key is not supplied, path manager 335 typically has a default setting for that it can use. Once the path attributes are selected, a reservation key is set on the target LUN at 450. This operation is typically accomplished using the PERSISTENT RESERVE OUT command with the RESERVE service action code specified. Use of this command with the RESERVE service action creates a persistent reservation on the target LUN having a particular SCOPE and TYPE.

The value in the SCOPE field indicates whether a persistent reservation applies to an entire LUN or to an element. The value in the TYPE field specifies the characteristics of the persistent reservation being established for all data blocks within the element or within the logical unit. Four different TYPE values are Write Exclusive, Exclusive Access, Write Exclusive—Registrants Only, and Exclusive Access—Registrants Only. For the Write Exclusive TYPE, any application client on any initiator may initiate tasks that request transfers from the storage medium or cache of the logical unit to the initiator (reads are shared), and any task from any initiator other than the initiator holding the persistent reservation that requests a transfer from the initiator to the storage medium or cache of the logical unit shall be terminated with RESERVATION CONFLICT status (writes are exclusive). For the Exclusive Access TYPE, any task from any initiator other than the initiator holding the persistent reservation that requests a transfer from the storage medium or cache of the logical unit to the initiator will be terminated with RESERVATION CONFLICT status, and any task from any initiator other than the initiator holding the persistent reservation that requests a transfer from the initiator to the storage medium or cache of the logical unit shall be terminated with RESERVATION CONFLICT status. For the Write Exclusive—Registrants Only TYPE, reads are shared, and a task that requests a transfer to the storage medium or cache of the logical unit from an initiator that is not currently registered with the device server shall be terminated with RESERVATION CONFLICT status. For the Exclusive Access—Registrants Only TYPE, a task that requests a transfer from the storage medium or cache of the logical unit to an initiator that is not currently registered with the device server shall be terminated with RESERVATION CONFLICT status, and a task that requests a transfer to the storage medium or cache of the logical unit from an initiator that is not currently registered with the device server shall be terminated with RESERVATION CONFLICT status. In some embodiments, the Exclusive Access—Registrants Only TYPE is used.

As noted above, although the described implementation utilizes SCSI-3 persistent reservation commands and associated parameters, e.g., keys, the commands and attributes of other protocols and/or standards can similarly be used to perform the described tasks. Systems allowing one host device to store a persistent attribute on a shared storage device and further allowing another host to read the stored attribute provide some examples of alternate embodiments.

A determination is made at 460 whether there are additional LUNs in a LUN group, i.e., in the case where the disk array is an A/PG type array. If there are additional LUNs in a LUN group, operation transitions to 470 where the next LUN in the group is selected. The process then proceeds back to the set reservation key step at 450. If there are no additional LUNs in a LUN group, operation proceeds to step 480. At this point, the host is registered with the target storage device and the appropriate path attribute information has been established. At this point, the software monitors for error conditions. Typical relevant error conditions include the detection of some failure (hardware or software) that compromises the current active path, I/O errors from disks, and secondary path failure detection in systems that posses multiple secondary paths. If there is no error condition determined at 490, the host is maintained in its registered state and continues to monitor for error conditions. If an error condition does occur, the process proceeds to 700 as shown in FIG. 7.

Figure 7:
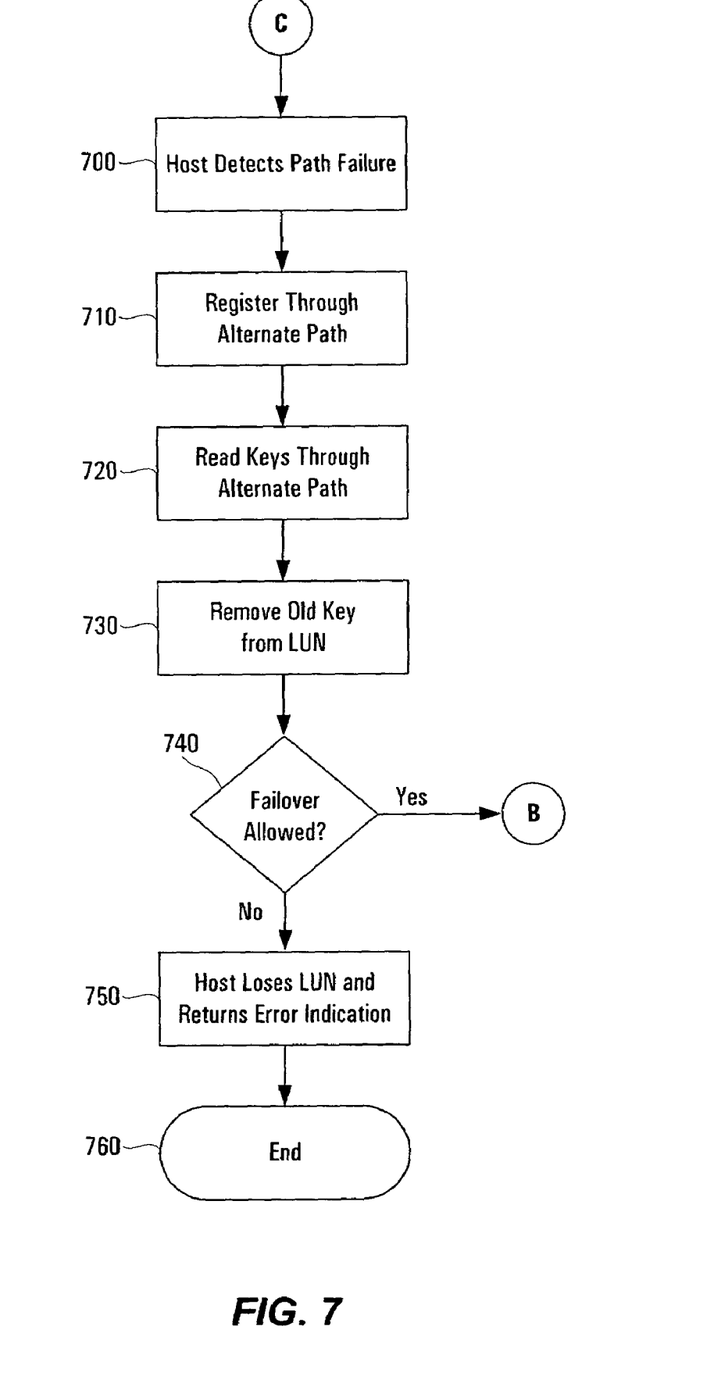
FIG. 7 is a flow chart illustrating techniques of the present invention.

FIG. 7 is a flow chart illustrating techniques of the present invention. In particular, FIG. 7 shows certain path management steps associated with the responding to an error condition. As shown at 700, the host computer system detects some path failure, or at least one or more indications that a path will fail. If the host determines that it cannot maintain the path (typically the current active path) without loosing access to the storage device, the host will register through an alternate path using information from the old key, i.e., the same key that was previously used to register the active path, or the old key itself (710). The registration process typically utilizes the PERSISTENT RESERVE OUT command with the REGISTER service action specified. Operation proceeds to step 720, where the host reads, via the alternate path, all of the keys present on the LUN. This operation can be accomplished using the PERSISTENT RESERVE IN command with the READ KEYS service action code specified. In response to receiving such a command, the LUN will return all of the reservation keys that are registered with the LUN. As shown in step 730, the host then removes the old key that was previously set to establish the former active path for which an error has been detected. Key removal can be accomplished using the PERSISTENT RESERVE OUT command with PREEMPT service action specified and including information about the persistent reservation key or keys to be removed. Specifying the PREEMPT service action causes the preemption of other persistent reservations present at the LUN and placed by other initiators. In general, other PERSISTENT RESERVE OUT commands with different service action codes can be used to accomplish this task. The old reservation key is removed to maintain consistent host connectivity information.

Next in 740, the path manager logic determines if a failover operation, e.g., from the active path to the passive path, is allowed. A variety of different conditions can be set before such a failover operation is allowed. In one embodiment, a minimal disruption condition must be met before the failover operation can be performed. For example, the path manager can examine some or all of the reservation keys retrieved in 720 to determine if it is possible to failover to the alternate path with no more than a certain number of hosts losing access to the LUN and while keeping all the hosts having the KEEP flag set connected to the LUN. A variety of other minimal disruption conditions can be imposed as will be understood by those having ordinary skill in the art. For example, the minimal disruption condition can depend only on KEEP flag setting. If a failover operation is not allowed, for example an alternate path does not exist or the minimal disruption condition is not met, the host loses access to the LUN and an appropriate error indication is sent to an administrator and/or some other supervisory software operating on the host computer system (750). The process then terminates 760.

Note that if the error condition requires other paths to be changed, e.g., active paths between the same host and different LUNs, active paths between other hosts and one or more LUNs, or changes in passive paths when more than one secondary path is present, one or more of the steps described above can be repeated for different hosts/LUNs/paths as needed.

Figure 6:
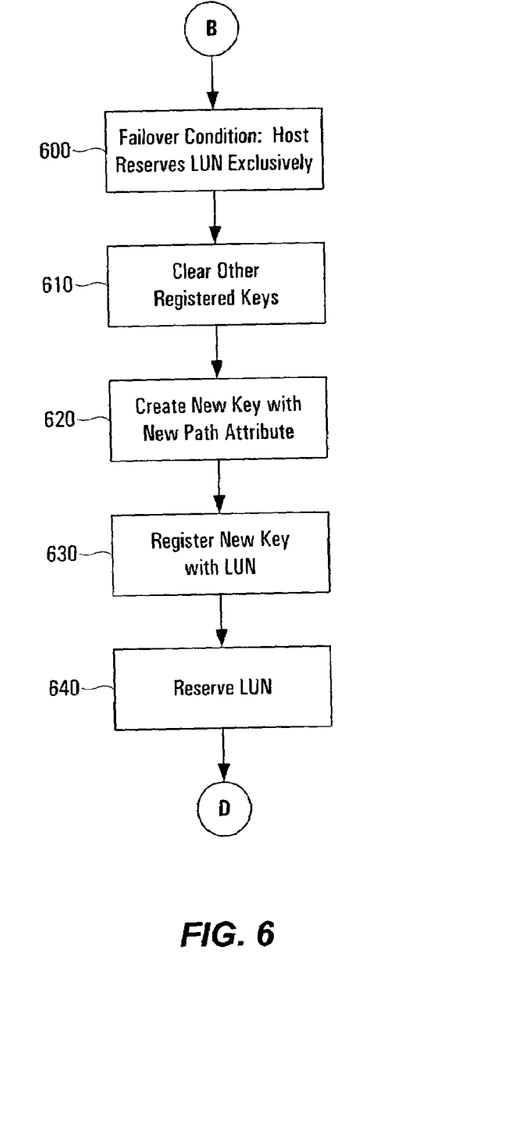
FIG. 6 is a flow chart illustrating techniques of the present invention.

If, as determined in 740, a failover operation is allowed, the process continues as shown in FIG. 6. In 600, the host computer system reserves the LUN exclusively using the current reservation key and the PERSISTENT RESERVE OUT command with PREEMPT service action. To accomplish the exclusive registration, the aforementioned Exclusive Access—Registrants Only TYPE code can be used. The other registered keys are the removed (610) again typically using the PERSISTENT RESERVE OUT command with PREEMPT service action. As shown in 620, a new key is formed using a new path attribute that is based on the new path information. The new key is registered with the LUN using, for example, the PERSISTENT RESERVE OUT command with the REGISTER & IGNORE EXISTING KEY service action code (630). The in 640, the LUN is reserved for the registrant only using, for example, the PERSISTENT RESERVE OUT command with PREEMPT service action code and specifying an appropriate TYPE code. At this point, operation transitions to 480 shown in FIG. 4 and proceeds accordingly as described above. Note that all other hosts will encounter I/O errors since their registrations/reservations have been cleared. By reading the reservation key, these hosts will find out that the path attribute corresponding to the relevant path, e.g., the active path, has changed. In such situations, the host computer systems typically wait for all I/Os to quiesce, register using a key containing the new path attribute information, failover to the new path, and retry any failed I/Os.

Figure 5:
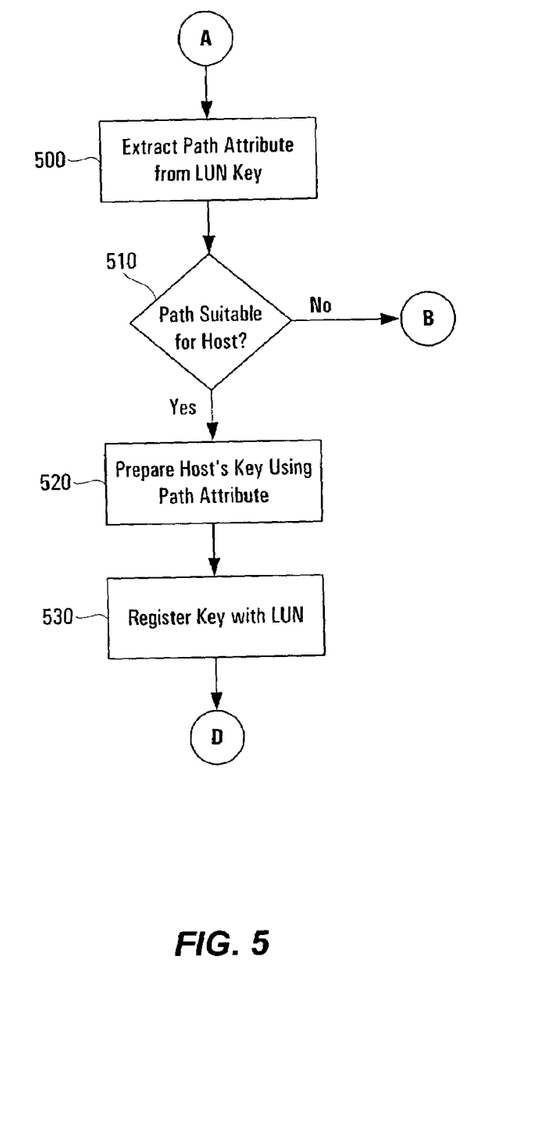
FIG. 5 is a flow chart illustrating techniques of the present invention.

Returning to 430 of FIG. 4, if a reservation key is returned in response to a query to a LUN, i.e., a host making an initial I/O access to an LUN finds a reservation key set, operation transitions to step 500 shown in FIG. 5. At that point, the path manager operating on the host extracts path attribute information from the returned reservation key. If the path attribute information indicates a path that is suitable for the host, e.g., the host can use the same active path, as determined at 510 the path manager prepares a key for the host using the extracted path attribute information (520) and registers with the key (530) using, for example, the PER- SISTENT RESERVE OUT command along with the REGISTER service action. At this point, operation transitions to 480 shown in FIG. 4 and proceeds accordingly as described above.

If the path manager determines at 510 that the host cannot use the path identified by the path attribute extracted from the LUN key, operation transitions to the failover procedure described in FIG. 6 and beginning at 600.

A variety of additional error reaction and recovery features can also be implemented in the path manager. For example, in situations where a path failure has occurred, the path manager, and associated daemon, or some other software operating on the host computer system can probe the failed path periodically to determine if path has become "healthy". When a path becomes healthy, the path manager can take steps to return operation to that path by, for example, changing the path attribute of the host's registration key. Additionally, all keys associated with the appropriate LUN can be read to determine if the path attribute has become suitable to perform the joining process (as described in connection with FIG. 5) if the present path attribute of the host has FALSE as the ACTIVE state.

Referring to the failover process shown in FIG. 6, if the host computer system fails (for whatever reason) after reserving the LUN exclusively, any other host waiting to register with the LUN can be configured to eventually timeout and preempt the failed host's exclusive reservation. The preempting host can also perform various joining steps with the hosts whose registrations are not yet cancelled. Additionally, in the event that a host computer system fails, another host computer system can be configured to cancel all registrations of the failing host. In one embodiment, this is accomplished by performing the failover process described above but specifying the same path as the current active path as the failover path, thereby effectively clearing all the keys and forcing the sharing hosts to re-register.

As with any system having multiple hosts operating in a similar manner, certain concurrency related issues can arise and should be handled accordingly. For example, in the initialization process described in connection with FIG. 4, if more than one host computer system tries to initialize, only one will succeed in placing a reservation on a device. The "losing" host(s) will ultimately read the latest path attribute present in the reservation key established by the "winning" host and will instead perform the above described joining process. This situation can also occur in the context of sharing an A/PG storage device. In such a situation, reservations of individual LUNs in a LUN group may be split among multiple hosts. If the path attributes are not in conflict, no problem occurs. Otherwise, one or more hosts which cannot use the path described in a particular path attribute can force a failover. Additionally, if more than one host attempts a failover operation, one of the hosts accomplishes the task first, and the remaining host(s) will read the latest path attribute from the winning hosts reservation key and perform the above described joining process.

The flow charts of FIGS. 4-7 illustrate some of the many operational examples of the storage device path coordination techniques disclosed in the present application. Those having ordinary skill in the art will readily recognize that certain steps or operations illustrated in FIGS. 4-7 can be eliminated or taken in an alternate order. Moreover, the methods described in FIGS. 4-7 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

FIG. 8 illustrates a block diagram of a computer system 800 for implementing the fencing techniques of the present invention. For example, computer system 800 can be an embodiment of one of the previously described cluster nodes. Computer system 800 includes a processor 810 and a memory 820 coupled together by communications bus 805. Processor 810 can be a single processor or a number of individual processors working together. Memory 820 is typically random access memory (RAM), or some other dynamic storage device, and is capable of storing instructions to be executed by the processor, e.g., appliance manager 440. Memory 820 is also used for storing temporary variables or other intermiediate information during the execution of instructions by the processor 810.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 440 can be provided to the computer system via a variety of computer readable media including electronic media (e.g. flash memory), magnetic storage media (e.g., hard disk 858, a floppy disk, etc.), optical storage media (e.g., CD-ROM 860), and communications media conveying signals encoding the instructions (e.g., via a network coupled to network interface 854).

Computer system 800 also includes devices such as keyboard & mouse 850, SCSI interface 852, network interface 854, graphics & display 856, hard disk 858, and CD-ROM 860, all of which are coupled to processor 810 by communications bus 807. It will be apparent to those having ordinary skill in the art that computer system 800 can also include numerous elements not shown in the figure, such as additional storage devices, communications devices, input devices, and Output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

Summary of SCSI-3 Persistent Reservations and Registration

This description of persistent reservation and registration commands utilizes terms defined in greater detail in the aforementioned *SCSI Primary Commands*-3 (SPC-3), "the standard". Additionally, a more complete description of these commands can be found in the standard. The standard describes various SCSI devices, and the hardware/software entities supporting SCSI functionality using several specific terms. For example, a SCSI target device contains logical units and target ports (sometimes referred to as targets), and receives device service and task management requests for processing. A logical unit is an externally addressable entity within a target that implements a SCSI device model and contains a device server. A device server is an object within a logical unit that executes SCSI tasks according to the rules of task management.

The persistent reservations management method is the mechanism specified by the standard for use by multiple initiators that require operations to be protected across initiator failures, which usually involve hard resets. Persistent reservations persist across recovery actions, to provide initiators with more detailed control over reservations recovery. Persistent reservations are not reset by the TARGET RESET task management function or other global actions. Persistent reservations for failing initiators may be preempted by another initiator as part of the recovery process. Persistent reservations are retained by the device server until released, preempted, or cleared by mechanisms specified in the standard. Even though different SCSI protocols that transport SCSI commands handle hard resets differently (e.g., parallel uses a reset signal, fibre channel loops use primitive signals) the persistent reservation shall be preserved. Optionally, persistent reservations may be retained when power to the target is removed.

The PERSISTENT RESERVE OUT and PERSISTENT RESERVE IN commands provide the basic mechanism for dynamic contention resolution in multiple initiator systems using multiple port targets. Before a persistent reservation may be established, an initiator shall register with a device server using a reservation key. Reservation keys are necessary to allow: a) authentication of subsequent PERSISTENT RESERVE OUT commands; b) identification of other initiators that are registered; c) identification of the reservation key(s) that have an associated reservation; d) preemption of a persistent reservation from a failing or uncooperative initiator; and e) multiple initiators to participate in a reservation. The reservation key provides a method for the application client to associate a protocol-independent identifier with an initiator on a specific port of a device server. The reservation key is used in the PERSISTENT RESERVE IN command to identify which initiators are registered and which initiator, if any, holds the reservation. The reservation key is used in the PERSISTENT RESERVE OUT command to register an initiator, to verify the initiator issuing the PERSISTENT RESERVATION OUT command is registered, and to specify which initiator's registration or persistent reservation to preempt. Reservation key values may be used by application clients to identify initiators, using application specific methods that are outside the scope of this standard.

The application client may request activation of the persist through power loss device server capability to preserve the persistent reservation and registration keys across power cycles. After the application client enables the persist through power loss capability the device server shall preserve all current and future registrations and persistent reservations associated with the logical unit to which the REGISTER or the REGISTER AND IGNORE EXISTING KEY service action was addressed until an application client disables the persist through power loss capability. The APTPL value from the most recent successfully completed REGISTER or REGISTER AND IGNORE EXISTING KEY service action from any application client shall determine the logical unit's behavior in the event of a power loss. The device server shall preserve the following information for each registration across any reset, and if the persist through power loss capability is enabled, across any power cycle: a) initiator identifier; b) reservation key; and c) when supported by the SCSI protocol, the initiator port's world wide identification. The device server shall preserve the following reservation information across any reset, and if the persist through power loss capability is enabled, across any power cycle: a) initiator identifier; b) reservation key; c) scope; d) type; and e) when supported by the SCSI protocol, the initiator port's world wide identification.

The application client may obtain information about the persistent reservation and the reservation keys that are present within a device server by issuing PERSISTENT RESERVE IN commands with a READ RESERVATION service action or a READ KEYS service action.

An application client may issue a PERSISTENT RESERVE IN command with a service action of READ KEYS to determine if any initiators have registered with a logical unit. In response to a PERSISTENT RESERVE IN with a READ KEYS service action the device server shall report the following: a) the current generation value; and b) the reservation key for every initiator that is currently registered. The generation value allows the application client to verify that the configuration of the initiators registered with a logical unit has not been modified. The application client may examine the reservation keys to identify relationships between initiators based on mechanisms that are outside the scope of this standard. Duplicate keys shall be reported if multiple initiators use the same reservation key.

An application client may issue a PERSISTENT RESERVE IN command with a service action of READ RESERVATION to receive the persistent reservation information. In response to a PERSISTENT RESERVE IN command with a READ RESERVATION service action the device server shall report the following as an uninterrupted series of actions: a) the current generation value; b) the registered reservation key, if any, associated with the initiator that holds the persistent reservation; c) the scope and type of each persistent reservation, if any; and d) the scope-specific address, if any. If an application client uses a different reservation key for each initiator/logical unit pair the application client may use the reservation key to associate the persistent reservation with the initiator that holds the persistent reservation.

To establish a persistent reservation the initiator shall first register with a logical unit. An initiator registers with a logical unit by issuing a PERSISTENT RESERVE OUT command with service action of REGISTER or REGISTER AND IGNORE EXISTING KEY. If the initiator has not yet established a reservation key or the reservation key has been removed, the registration is accomplished by issuing a PERSISTENT RESERVE OUT command with service action of REGISTER with the certain parameters. If the initiator has an established registration it may change its reservation key. This is accomplished by issuing a PERSISTENT RESERVE OUT command with service action of REGISTER with necessary parameters. Alternatively, an initiator may establish a reservation key without regard for whether one has previously been established by issuing a PERSISTENT RESERVE OUT command with a service action of REGISTER AND IGNORE EXISTING KEY and the necessary parameters. If a PERSISTENT RESERVE OUT with a REGISTER AND IGNORE EXISTING KEY service action is sent when an established registration key exists, the registration shall be superseded with the specified service action reservation key. If a PERSISTENT RESERVE OUT with a REGISTER AND IGNORE EXIST- ING KEY service action is sent when there is no established registration key, a new registration shall be established. If a PERSISTENT RESERVE OUT with a REGISTER or a REGISTER AND IGNORE EXISTING KEY service action is attempted, but there are insufficient device server resources to complete the operation, the device server shall return a CHECK CONDITION status. In response to a PERSISTENT RESERVE OUT with a REGISTER or a REGISTER AND IGNORE EXISTING KEY service action the device server shall perform a registration via a specified series of actions.

After the registration request has been processed, the device server shall then allow other PERSISTENT RESERVE OUT commands from the registered initiator to execute. For each initiator that performs a PERSISTENT RESERVE OUT with a REGISTER or a REGISTER AND IGNORE EXISTING KEY service action, the device server shall retain the reservation key until the key is changed by a new PERSISTENT RESERVE OUT command with the REGISTER or the REGISTER AND IGNORE EXISTING KEY service action from the same initiator or until the initiator registration is removed. Any PERSISTENT RESERVE OUT command service action received from an unregistered initiator, other than the REGISTER or the REGISTER AND IGNORE EXISTING KEY service action, shall be rejected with a RESERVATION CONFLICT status.

An application client creates a persistent reservation by issuing a PERSISTENT RESERVE OUT command with a service action of RESERVE through a registered initiator with the following parameters: a) RESERVATION KEY set to the value of the initiator/logical unit pair's established reservation key; and b) TYPE and SCOPE set to the reservation being created. Only one persistent reservation with a scope of logical unit is allowed at a time per logical unit. Multiple persistent reservations with a scope of element may be created in a logical unit that contains multiple elements. However, there shall only be one persistent reservation per element. If the target receives a PERSISTENT RESERVE OUT command that attempts to create a persistent reservation when a persistent reservation already exists for the logical unit from an initiator other than the initiator that created the reservation, then the command shall be rejected with a RESERVATION CONFLICT status. If the initiator that created the persistent reservation attempts to modify the TYPE or SCOPE of an existing reservation, then the command shall be rejected with a RESERVATION CONFLICT status. If the target receives a RESERVE(10) or RESERVE (6) command when a persistent reservation exists for the logical unit then the command shall be rejected with a RESERVATION CONFLICT.

A registered initiator using the value of the initiator/logical unit pair's established reservation key may release or preempt a persistent reservation by issuing one of the following commands: a) a PERSISTENT RESERVE OUT command with a service action of RELEASE from the initiator that performed the reservation; b) a PERSISTENT RESERVE OUT command with a PREEMPT service action specifying the reservation key of the initiator holding the reservation; c) a PERSISTENT RESERVE OUT command with a PREEMPT AND ABORT service action specifying the reservation key of the initiator holding the reservation; or d) a PERSISTENT RESERVE OUT command with a service action of CLEAR service action.

A registered initiator using the value of the initiator/logical unit pair's established reservation key may remove a registration by issuing one of the following commands: a) a PERSISTENT RESERVE OUT command with a PREEMPT service action specifying that reservation key; b) a PERSISTENT RESERVE OUT command with a PREEMPT AND ABORT service action specifying that reservation key; c) a PERSISTENT RESERVE OUT command with a CLEAR service action; or d) a PERSISTENT RESERVE OUT command with a REGISTER or a REGISTER AND IGNORE EXISTING KEY service action from the same initiator with the value of the service action reservation key field set to zero.

When a reservation key has been removed, no information shall be reported for that unregistered initiator in subsequent READ KEYS service action(s) until the initiator is registered again. Any persistent reservation associated with that unregistered initiator shall be released. If that released persistent reservation was of the type Write Exclusive—Registrants Only or Exclusive Access—Registrants Only the device server shall establish a unit attention condition for all registered initiators other than the initiator that issued the PERSISTENT RESERVE OUT command with PREEMPT or PREEMPT AND ABORT service action. The sense key shall be set to UNIT ATTENTION and the additional sense data shall be set to RESERVATIONS RELEASED. A persistent reservation may also be released by a loss of power, if the persist through power loss capability is not enabled.

What is claimed is:

1. A method comprising:
    receiving information about at least one input/output (I/O) port of a shared device belonging to a distributed computing system;
    forming a path attribute using at least a portion of the information about at least one I/O port of a shared device, wherein the path attribute at least partially describes at least one data transmission path between a host computer system and the shared device; and
    sending the path attribute to the shared device, wherein the sending the path attribute to the shared device further comprises forming a reservation key using the path attribute, and
    issuing a reservation command to the shared device, the reservation command including the reservation key as an attribute.

2. The method of claim 1 further comprising:
    querying the shared device to determine the information about at least one I/O port of a shared device, wherein the querying further comprises requesting information about at least one of an active I/O port of the shared device and a passive I/O port of the shared device.

3. The method of claim 1 wherein the shared device is a shared storage device.

4. The method of claim 3 wherein the shared storage device is one of an active/passive disk array operating in auto-trespass mode, an active/passive disk array operating in explicit failover mode, and an active/passive disk array with logical unit (LUN) group failover.

5. The method of claim 3 wherein the shared storage device supports a plurality of access paths to at least a portion of data stored on the shared storage device, and wherein a first one of the plurality of access paths is inactive when a second one of the plurality of access paths is active.

6. The method of claim 1 wherein the path attribute includes at least one of: a flag indicating whether a host computer system should always have access to the shared device; a flag indicating whether a host computer system is able to access the shared device; a counter indicating the number of paths used by a host computer system to access the shared device; and a value indicating which of the at least one I/O port(s) is an active port.

7. The method of claim 1 further comprising:
attempting to access the shared device by performing an I/O operation targeting the shared device.

8. The method of claim 1 further comprising:
reading at least one reservation key stored on the shared device; and
obtaining the information about at least one I/O port of the shared device from the at least one reservation key.

9. The method of claim 1 further comprising:
determining whether the at least one data transmission path between the host computer system and the shared device is suitable for use by the host computer system.

10. The method of claim 1 further comprising:
sending at least one command to the shared device, the at least one command causing the removal of at least one reservation key from the shared device.

11. The method of claim 1 wherein the shared device includes at least one logical unit (LUN) supporting small computer system interface version three (SCSI-3) persistent reservation commands.

12. The method of claim 1 wherein the shared device supports a communications protocol other than small computer system interface version three (SCSI-3).

13. A computer readable storage medium encoding instructions executable on a processor, the computer readable storage medium being one of an electronic storage medium, a magnetic storage medium, and an optical storage medium encoding the instructions, the instructions operable to allow the processor to:
receive information about at least one input/output (I/O) port of a shared device belonging to a distributed computing system;
form a path attribute using at least a portion of the information about at least one I/O port of a shared device, wherein the path attribute at least partially describes at least one data transmission path between a host computer system and the shared device; and
send the path attribute to the shared device, wherein the instructions operable to allow the processor to send the path attribute to the shared device further comprise instructions operable to allow the processor to form a reservation key using the path attribute, and
issue a reservation command to the shared device, the reservation command including the reservation key as an attribute.

14. A system comprising:
a shared device discovery module configured to determine information about at least one input/output (I/O) port of a shared device belonging to a distributed computing system;
a path manager in communication with the shared device discovery module, the path manager operable to:
process the information about the at least one I/O port of a shared device to form a path attribute, wherein the path attribute at least partially describes at least one data transmission path between a host computer system and the shared device;
transmit the path attribute to the shared device;
form a reservation key using the path attribute; and
send a reservation command to the shared device, the reservation command including the reservation key as an attribute;
a memory; and
a processor coupled to the memory, wherein at least one of the shared device discovery module and path manager are encoded as instructions stored in the memory and executable on the processor.

15. The system of claim 14 further comprising:
a database coupled to the shared device discovery module, the database storing the information about at least one input/output (I/O) port of a shared device.

16. The system of claim 14 further comprising a shared storage device, wherein the shared device is the shared storage device.

17. The system of claim 16 wherein the shared storage device supports a plurality of access paths to at least a portion of data stored on the shared storage device, and wherein a first one of the plurality of access paths is inactive when a second one of the plurality of access paths is active.

18. The system of claim 16 wherein the shared storage device is one of an active/passive disk array operating in auto-trespass mode, an active/passive disk array operating in explicit failover mode, and an active/passive disk array with logical unit (LUN) group failover.

19. The system of claim 14 wherein the path attribute includes at least one of: a flag indicating whether a host computer system should always have access to the shared device; a flag indicating whether a host computer system is able to access the shared device; a counter indicating the number of paths used by a host computer system to access the shared device; and a value indicating which of the at least one I/O port(s) is an active port.

20. The system of claim 14 wherein the path manager is further operable to:
read at least one reservation key stored on the shared device; and
obtain additional information about the at least one I/O port of the shared device from the at least one reservation key.

21. The system of claim 14 wherein the path manager is further operable to determine whether the at least one data transmission path between the host computer system and the shared device is suitable for use by the host computer system.

22. The system of claim 14 wherein the path manager is further operable to send at least one command to the shared device, the at least one command causing the removal of at least one reservation key from the shared device.

23. The system of claim 14 wherein the shared device includes at least one logical unit (LUN) supporting small computer system interface version three (SCSI-3) persistent reservation commands.

24. The system of claim 14 wherein the shared device discovery module is further configured to request information from the shared device about at least one of an active I/O port of the shared device and a passive I/O port of the shared device.

25. The system claim 14 wherein the shared device supports a communications protocol other than small computer system interface version three (SCSI-3).

26. An apparatus comprising:
a shared device belonging to a distributed computing system;
a means for receiving information about at least one input/output (I/O) port of the shared device;
a means for forming a path attribute using at least a portion of the information about at least one I/O port, of the shared device, wherein the path attribute at least partially describes at least one data transmission path between a host computer system and the shared device;
a means for sending the path attribute to the shared device;

a means for forming a reservation key using the path attribute; and a means for issuing a reservation command to the shared device the reservation command including the reservation key as an attribute.

27. The apparatus of claim 26 further comprising:
a means for sending at least one command to the shared device, the at least one command causing the removal of at least one reservation key from the shared device.

28. The apparatus of claim 26 further comprising:
a means for querying the shared device to determine the information about at least one I/O port of a shared device, wherein the querying further comprises requesting information about at least one of an active I/O port of the shared device and a passive I/O port of the shared device.

* * * * *